(12) United States Patent
Kong et al.

(10) Patent No.: US 9,009,686 B2
(45) Date of Patent: Apr. 14, 2015

(54) ALGORITHM FOR 64-BIT ADDRESS MODE OPTIMIZATION

(71) Applicant: NVIDIA Corporation, Santa Clara, CA (US)

(72) Inventors: Xiangyun Kong, Union City, CA (US);
Jian-Zhong Wang, Fremont, CA (US);
Vinod Grover, Mercer Island, WA (US)

(73) Assignee: NVIDIA Corporation, Santa Clara, CA (US)

( * ) Notice: Subject to any disclaimer, the term of this patent is extended or adjusted under 35 U.S.C. 154(b) by 191 days.

(21) Appl. No.: 13/659,786

(22) Filed: Oct. 24, 2012

(65) Prior Publication Data

US 2013/0117735 A1    May 9, 2013

Related U.S. Application Data

(60) Provisional application No. 61/556,782, filed on Nov. 7, 2011.

(51) Int. Cl.
*G06F 9/45* (2006.01)

(52) U.S. Cl.
CPC ...................................... *G06F 8/443* (2013.01)

(58) Field of Classification Search
None
See application file for complete search history.

(56) References Cited

U.S. PATENT DOCUMENTS

| | | | |
|---|---|---|---|
| 5,613,117 A | 3/1997 | Davidson et al. | |
| 6,078,745 A * | 6/2000 | De Greef et al. | 717/151 |
| 6,256,784 B1 | 7/2001 | Grove | |
| 6,748,587 B1 * | 6/2004 | Santhanam et al. | 717/140 |
| 6,757,892 B1 | 6/2004 | Gokhale et al. | |
| 6,865,614 B2 * | 3/2005 | Fischer et al. | 717/140 |
| 6,941,549 B1 * | 9/2005 | Holder et al. | 717/140 |
| 7,107,584 B2 * | 9/2006 | Bond et al. | 717/151 |
| 7,162,716 B2 * | 1/2007 | Glanville et al. | 717/151 |
| 7,389,499 B2 * | 6/2008 | Donovan et al. | 717/143 |
| 7,539,695 B2 * | 5/2009 | Nishiyama | 707/999.101 |
| 7,814,467 B2 * | 10/2010 | Li et al. | 717/146 |
| 8,411,096 B1 * | 4/2013 | Mahan et al. | 345/522 |
| 2003/0028864 A1 | 2/2003 | Bowen | |
| 2003/0121029 A1 * | 6/2003 | Harrison et al. | 717/151 |
| 2004/0205740 A1 * | 10/2004 | Lavery et al. | 717/151 |

(Continued)

OTHER PUBLICATIONS

Helge Rhodin, "A PTX Code Generator for LLVM", Oct. 29, 2010, Saarland University, Saarbrücken, Germany, pp. 1-63; <www.cdl.uni-saarland.de/publications/theses/rhodin_bsc.pdf>.*

(Continued)

*Primary Examiner* — Thuy Dao
*Assistant Examiner* — Ben C Wang
(74) *Attorney, Agent, or Firm* — Artegis Law Group, LLP

(57) ABSTRACT

One embodiment of the present invention sets forth a technique for extracting a memory address offset from a 64-bit type-conversion expression included in high-level source code of a computer program. The technique involves receiving the 64-bit type-conversion expression, where the 64-bit type-conversion expression includes one or more 32-bit expressions, determining a range for each of the one or more 32-bit expressions, calculating a total range by summing the ranges of the 32-bit expressions, determining that the total range is a subset of a range for a 32-bit unsigned integer, calculating the memory address offset based on the ranges for the one or more 32-bit expressions, and generating at least one assembly-level instruction that references the memory address offset.

20 Claims, 3 Drawing Sheets

(56) References Cited

U.S. PATENT DOCUMENTS

| | | | |
|---|---|---|---|
| 2005/0071823 A1 | 3/2005 | Lin et al. | |
| 2005/0102658 A1* | 5/2005 | Li et al. | 717/140 |
| 2005/0197977 A1 | 9/2005 | Buck et al. | |
| 2006/0048117 A1* | 3/2006 | Archambault et al. | 717/151 |
| 2006/0101425 A1* | 5/2006 | Donovan et al. | 717/136 |
| 2007/0276794 A1* | 11/2007 | Nishiyama | 707/2 |
| 2007/0294679 A1* | 12/2007 | Bobrovsky et al. | 717/146 |
| 2010/0205586 A1* | 8/2010 | Mun | 717/140 |
| 2010/0306749 A1* | 12/2010 | Rioux | 717/141 |
| 2011/0078406 A1* | 3/2011 | Nickolls et al. | 711/202 |
| 2011/0078653 A1 | 3/2011 | Deneau | |
| 2011/0154303 A1* | 6/2011 | Rice et al. | 717/140 |
| 2011/0271170 A1* | 11/2011 | Walker | 714/819 |
| 2012/0233440 A1* | 9/2012 | Stephens et al. | 711/220 |
| 2013/0117548 A1* | 5/2013 | Grover et al. | 712/226 |
| 2013/0117737 A1* | 5/2013 | Sastry et al. | 717/160 |
| 2013/0185703 A1* | 7/2013 | Davis et al. | 717/140 |
| 2013/0198498 A1* | 8/2013 | Koju et al. | 712/234 |

OTHER PUBLICATIONS

Anatoliy Kuznetsov, "64-bit Programming and Optimization", 2002 SourceForge, pp. 1-3; <http://bmagic.sourceforge.net/bm64opt.html>.*

Li et al., "An Efficient Code Update Scheme for DSP Applications in Mobile Embedded Systems", 2010 ACM, LCTES'10, Apr. 13, 2010, pp. 105-114; <http://dl.acm.org/results.cfm?h=1&source_query=&&cfid=603384239&cftoken=64589296=64589296>.*

Yang et al., "A GPGPU Compiler for Memory Optimization and Parallelism Management", 2010 ACM, PLDI'10, Jun. 5, 2010, pp. 1-12; <http://dl.acm.org/results.cfm?h=1&source_query=&&cfid=603384239&cftoken=64589296>.*

Liu et al., "A Cross-Input Adaptive Framework for GPU Program Optimizations", May 23, 2009, IEEE, pp. 1-10; <http://ieeexplore.ieee.org/stamp/stamp.jsp?tp=&arnumber=5160988>.*

International Search Report and Written Opinion dated Jan. 31, 2013, International Application No. PCT/US12/63730.

* cited by examiner

ALGORITHM FOR 64-BIT ADDRESS MODE OPTIMIZATION

CROSS-REFERENCE TO RELATED APPLICATIONS

This application claims priority to United States provisional patent application titled, "METHODS FOR OPTIMIZING GPU MEMORY ALLOCATION AND PROCESSING" filed on Nov. 7, 2011 and having Ser. No. 61/556,782, which is herein incorporated by reference.

BACKGROUND OF THE INVENTION

1. Field of the Invention

The present invention generally relates to computer processing, and, more specifically, to an algorithm for 64-bit address mode optimization.

2. Description of the Related Art

Developers use compilers to generate executable programs from high-level source code. Typically, a compiler is configured to receive high-level source code of a program (e.g., written in C++ or Java), determine a target hardware platform on which the program will execute (e.g., an x86 processor), and then translate the high-level source code into assembly-level code that can be executed on the target hardware platform. This configuration provides the benefit of enabling the developers to write a single high-level source code program and then target that program for execution across a variety of hardware platforms, such as mobile devices, personal computers, or servers.

In general, a compiler includes three components: a front-end, a middle-end, and a back-end. The front-end is configured to ensure that the high-level source code satisfies programming language syntax and semantics, whereupon the front-end generates a first intermediate representation (IR) of the high-level source code. The middle-end is configured to receive and optimize the first IR, which usually involves, for example, removing unreachable code, if any, included in the first IR. After optimizing the first IR, the middle-end generates a second IR for the back-end to process. In particular, the back-end receives the second IR and translates the second IR into assembly-level code.

To promote the generation of efficient assembly-level code, reducing both the number of registers referenced in the assembly-level code and the amount of address-computation code included therein is desirable. One approach used to effect these reductions is referred to herein as the "register plus offset" approach, which involves generating assembly-level instructions that reference a base address register and a constant offset. For instance, in the CUDA™ architecture, one may load a value from global memory to a register "f12" via the assembly-level instruction "Id.global.f32 f12, [rd12+64]", where "rd12" is the base address register and "64" is the constant offset. According to this approach, multiple memory addresses are beneficially able to share the same base address register "rd12". For example, when "rd12" stores the value "16," the expression [rd12+64] causes the value stored in memory address [80] to be loaded into the global memory address "f12." Similarly, when "rd12" stores the value "20," the expression [rd12+64] causes the value stored in memory address [84] to be loaded into the global memory address "f12." Accordingly, it is desirable for compilers to be capable of identifying high-level instructions that can be reduced to assembly-level instructions that implement the "register plus offset" approach.

Popular types of high-level instructions that can, in some cases, be reduced according to the above approach include high-level instructions that reference a 64-bit base memory address that is offset by a 32-bit expression. An example of this format is "64-bit-base-address+(uint64_t) (32-bit expression)", where the 32-bit expression is type-converted to 64-bits (via the "uint64_t" typecast notation) so that the resultant value of the 32-bit expression is 64-bits. An example of a high-level instruction that implements the above format is "&p+(uint64_t) (−20*x+30*y+1100)". In view of the "register plus offset" approach described above, it is desirable to determine if a constant offset can be extracted from the expression "(−20*x+30*y+1100)" in the high-level instruction. Unfortunately, the 64-bit type conversion introduces several complex issues in making such a determination, especially when the expression includes unsigned integer arithmetic. In particular, several programming language standards—such as the standards for C/C++—design unsigned computations to produce wrap-around values when overflows occur. As a result, conventional compilers are oftentimes incapable of effectively translating eligible high-level instructions into assembly-level instructions that implement the "register plus offset" approach.

Accordingly, what is needed in the art is a technique that allows constant offsets to be extracted from high-level instructions to be used in generated assembly-level instructions that implement the "register plus offset" approach.

SUMMARY OF THE INVENTION

One embodiment of the present invention sets forth a method for extracting a memory address offset from a 64-bit type-conversion expression included in high-level source code of a computer program. The method includes the steps of receiving the 64-bit type-conversion expression, where the 64-bit type-conversion expression includes one or more 32-bit expressions, determining a range for each of the one or more 32-bit expressions, calculating a total range by summing the ranges of the 32-bit expressions, determining that the total range is a subset of a range for a 32-bit unsigned integer, calculating the memory address offset based on the ranges for the one or more 32-bit expressions, and generating at least one assembly-level instruction that references the memory address offset.

One advantage of the disclosed embodiments is that a compiler is configured to extract memory address constant offsets from high-level instructions of a computer program so that they can be used in assembly-level instructions that implement the "register plus offset" approach described herein. As a result, there may be an overall reduction in the number of registers referenced by the computer program, as well as an overall reduction in the complexity of the address computations included therein. Advantageously, the computer program may execute more efficiently on processors and may allow for other computer programs to utilize the freed-up registers.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
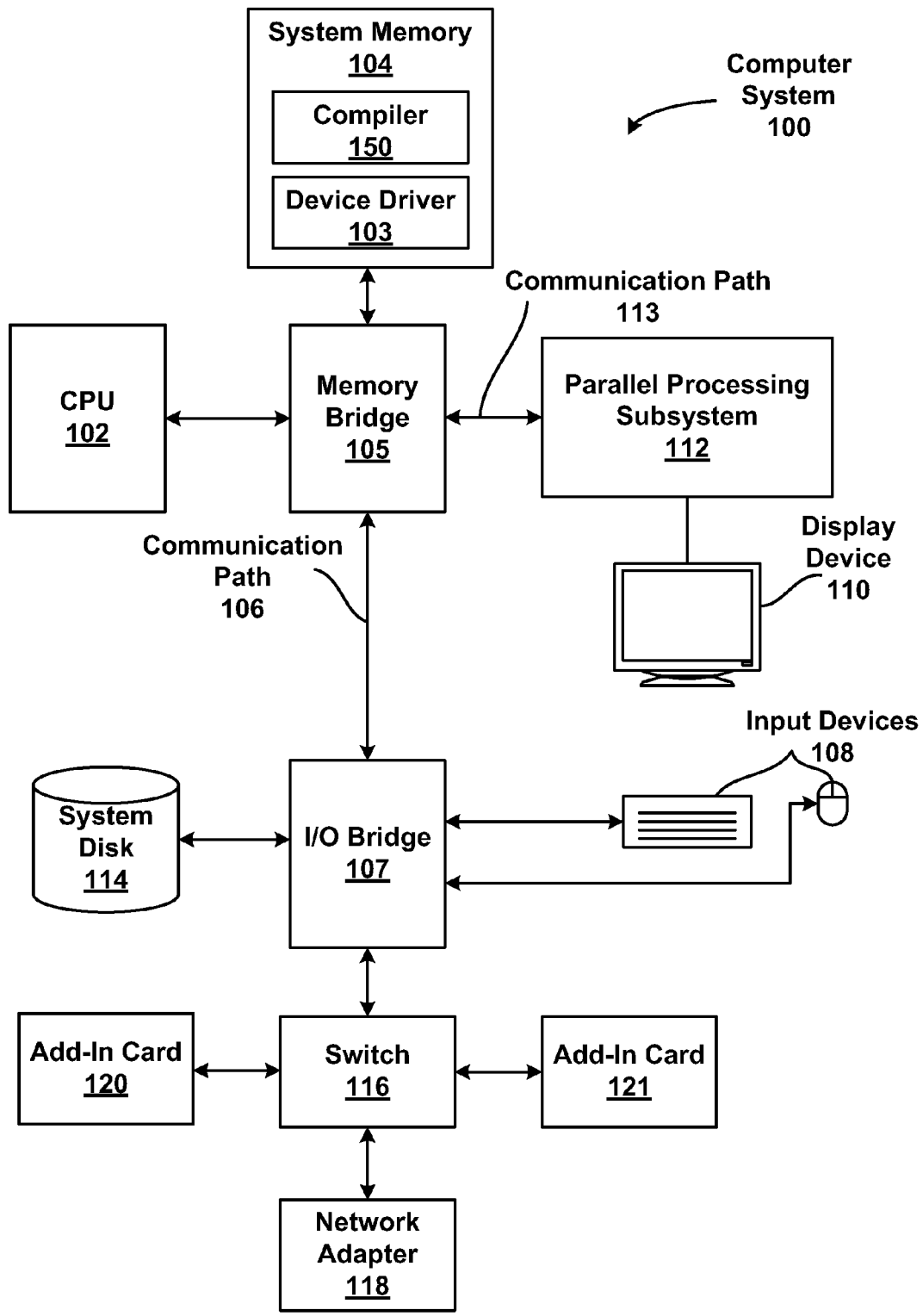
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 that may be any conventional cathode ray tube, liquid crystal display, light-emitting diode display, or the like. A system disk 114 is also connected to I/O bridge 107 and may be configured to store content and applications and data for use by CPU 102 and parallel processing subsystem 112. System disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices.

A switch 116 provides connections between I/O bridge 107 and other components such as a network adapter 118 and various add-in cards 120 and 121. Other components (not explicitly shown), including universal serial bus (USB) or other port connections, compact disc (CD) drives, digital versatile disc (DVD) drives, film recording devices, and the like, may also be connected to I/O bridge 107. The various communication paths shown in FIG. 1, including the specifically named communication paths 106 and 113 may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

In one embodiment, parallel processing subsystem 112 includes one or more parallel processing units (PPUs), each of which is coupled to a local parallel processing (PP) memory. In general, parallel processing subsystem 112 includes a number U of PPUs, where U>=1. In some embodiments, some or all of the PPUs in the parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with the local parallel processing memory (which can be used as graphics memory including, e.g., a conventional frame buffer) to store and update pixel data, delivering pixel data to display device 110, and the like. In some embodiments, the parallel processing subsystem 112 may include one or more PPUs that operate as graphics processors and one or more other PPUs that are used for general-purpose computations. The PPUs may be identical or different, and each PPU may have a dedicated parallel processing memory device(s) or no dedicated parallel processing memory device(s).

It will be appreciated that the system of FIG. 1 is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

64-Bit Address Mode Optimization

As set forth in greater detail herein, embodiments of the present invention involves a compiler 150 executing on the computer system 100 of FIG. 1 that is configured to implement an algorithm for automatically translating high-level instructions of a computer program into assembly-level instructions that implement the "register plus offset" approach previously described herein. Specifically, the compiler 150 receives high-level source code of the computer program and identifies at least one high-level instruction that references a 64-bit base address that is offset by a 32-bit expression. Upon identification, the compiler 150 determines whether a constant offset can be safely extracted from the 32-bit expression, where the constant offset is included in generated assembly-level instructions that implement the "register plus offset" approach. As noted above, executing this technique may result in an overall reduction in the number of registers referenced by the computer program as well as in an overall reduction in the complexity of the address computations included therein. Advantageously, from a system perspective, the computer program may execute more efficiently and may allow other computer programs executing within the system to utilize the registers freed up by the disclosed technique.

Figure 2A:
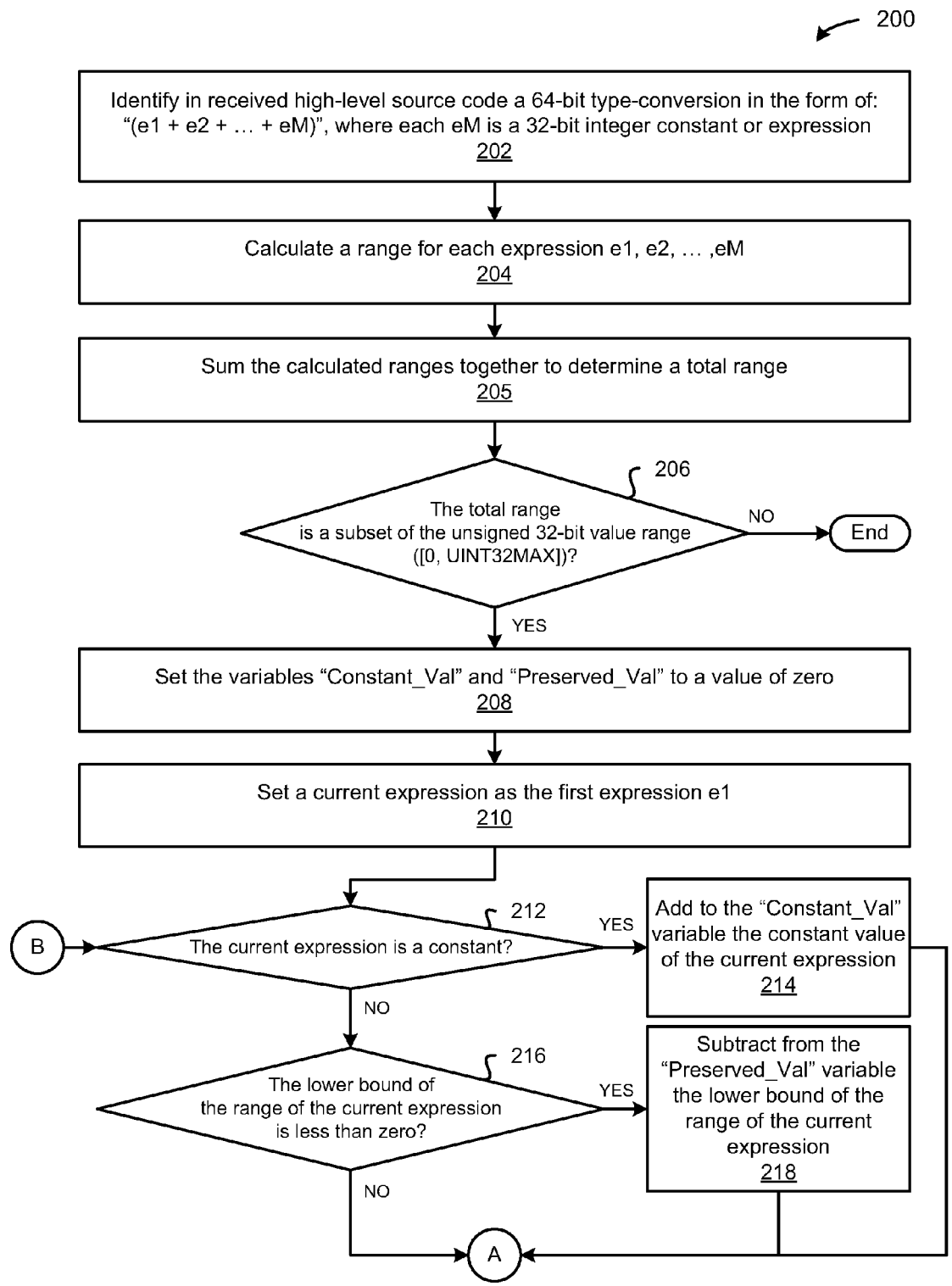
FIGS. 2A-2B illustrate a flow diagram of method steps for extracting a constant offset from a high-level instruction of a computer program to be used in assembly-level instructions that implement the "register plus offset" approach, according to one embodiment of the present invention
Figure 2B:
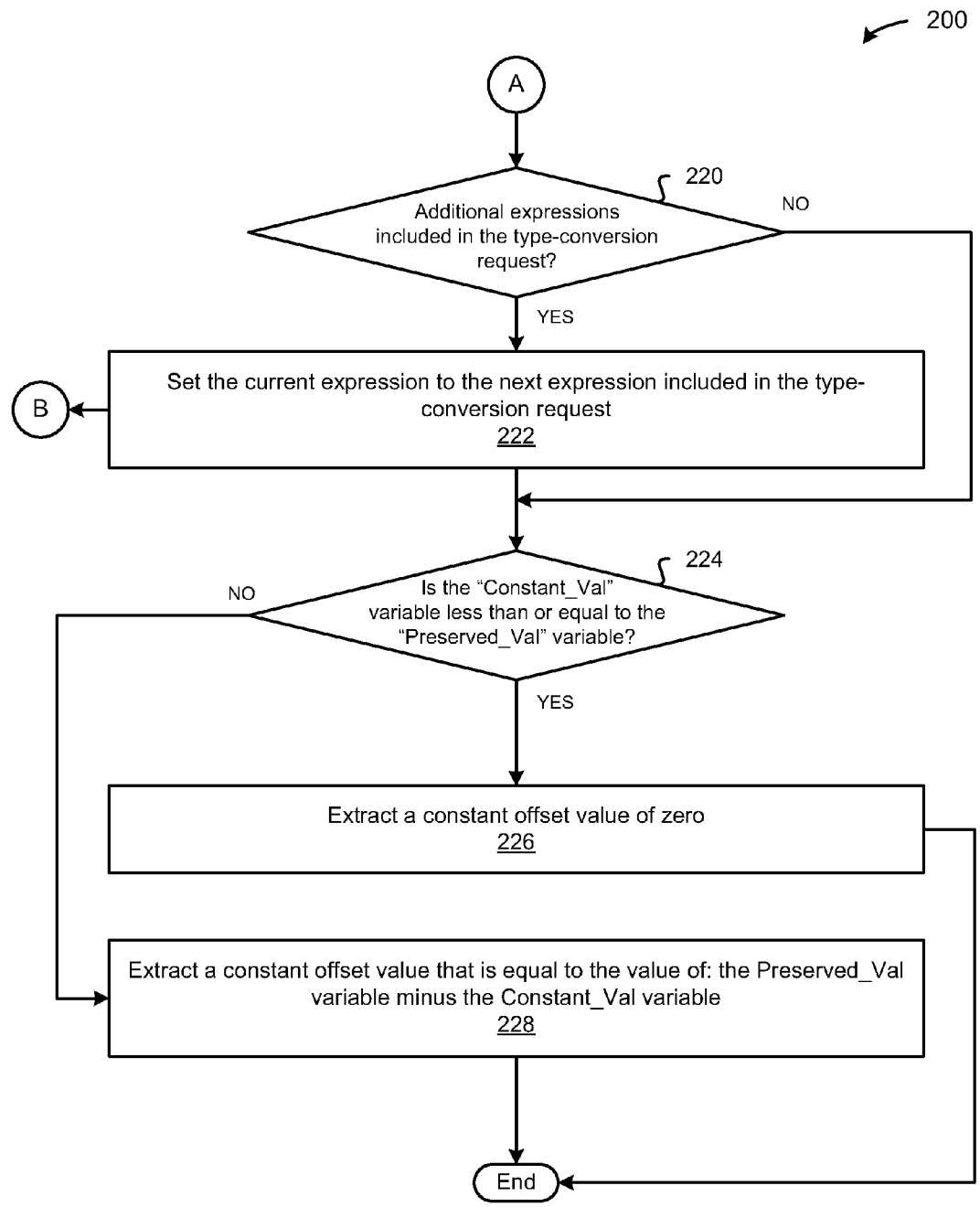

FIGS. 2A-2B illustrate a flow diagram of method steps 200 for extracting a constant offset from a high-level instruction of a computer program to be used in assembly-level instructions that implement the "register plus offset" approach, according to one embodiment of the present invention. Although the method steps are described in conjunction with the systems of FIG. 1, persons of ordinary skill in the art will understand that any system configured to perform the method steps, in any order, is within the scope of the invention.

As shown, a method 200 begins at step 202, where the compiler 150 identifies in high-level source code received by the compiler 150 a 64-bit type-conversion in the form: "(e1+ e2+ ... +eM)", where each eM is a 32-bit integer constant or expression. One example of a high-level instruction that includes a 64-bit type-conversion is "&p+(uint64_t) (−20*x+ 30*y+1100)", where &p is a 64-bit base address, "−20*x" and "30*y" are 32-bit integer expressions, "1100" is a 32-bit integer constant, and "(uint64_t)" is the 64-bit type-conversion.

At step 204, the compiler 150 calculates a range for each expression e1, e2, ..., eM. In one embodiment, the compiler 150 is configured to identify the lowest possible value for each expression eM as well as the highest possible value for each expression eM. When the expression eM is a 32-bit constant, the range is simply equivalent to the 32-bit constant value—e.g., "1100")—and the lowest possible value is equal to the highest possible value. However, when the expression eM is an actual 32-bit expression—e.g., "−20*x"—the compiler 150 parses the high-level code to determine the range by determining both the lowest possible value for "x" and the highest possible value for "x" and then executes the arithmetic defined by the 32-bit expression to establish a final range. For example, if the compiler 150 determines that the range of "x" of the 32-bit expression "−20*x" is [0,100], then the range for the 32-bit expression is [−20*100, −20*0]=[− 200, 0]. As described in further detail below, these calculated ranges are used by the compiler 150 to determine whether a constant offset can be safely extracted from the 64-bit type-conversion, and, if so, determine the correct value of the constant offset.

At step 205, the compiler 150 sums together the ranges of e1, e2, ..., eM to determine a total range of the expression included in the received high-level source code (i.e., a total range for e1, e2, ..., eM). At step 206, the compiler 150 determines whether the total range is a subset of the unsigned 32-bit value range ([0, UINT32MAX]). If, at step 206 the compiler 150 determines that the total range is a subset of the unsigned 32-bit value range ([0, UINT32MAX]), then the method 200 proceeds to step 208, described below. Otherwise, the high-level method 200 ends since no constant offset can be safely extracted from the 64-bit type-conversion.

At step 208, the compiler 150 sets the variables "Constant_Val" and "Preserved_Val" to a value of zero. At step 210, the compiler 150 sets a current expression as the first expression e1. In one embodiment, the current expression is implemented as a pointer that points to an expression eM so that the compiler can efficiently parse each eM included in the 64-bit type-conversion.

At step 212, the compiler 150 determines whether the current expression is a constant. Notably, at the first pass of step 212, the current expression points to the expression e1. If, at step 212 the compiler 150 determines that the current expression is a constant (e.g., "1100"), then the method 200 proceeds to step 514, where the compiler 150 adds to the "Constant_Val" variable the constant value of the current expression.

If, at step 212 the compiler 150 determines that the current expression is not a constant, then the compiler 150 knows that the current expression is, in fact, an expression (e.g., "−20*x"). Accordingly, the method 200 proceeds to step 216, where the compiler 150 determines whether the lower bound of the range of the current expression is less than zero. If, at step 216, the compiler 150 determines that the lower bound of the range of the current expression is less than zero, then the method 200 proceeds to step 218. At step 218, the compiler 150 subtracts from the "Preserved_Val" variable the lower bound of the range of the current expression. The method 200 then proceeds to step 220, described below.

Notably, if both step 212 and step 216 are false, then the current expression does not have an effect on the values of the "Constant_Val" variable and the "Preserved_Val" variable. Instead, the method 200 proceeds to step 220, where the compiler 150 analyzes the next expression eM included in the 64-bit type-conversion, if any.

At step 220, the compiler 150 determines whether additional expressions are included in the type-conversion request. If, at step 220 the compiler 150 determines that additional expressions are included in the type-conversion request, then the method 200 proceeds to step 222. Otherwise, the method 200 proceeds to step 224, described below.

At step 222, the compiler 150 sets the current expression to the next expression included in the type-conversion request. For example, if the current expression points to e1, then at step 222 the current expression is updated to point to e2.

At step 224, the compiler 150 determines whether the "Constant_Val" variable is less than or equal to the "Preserved_Val" variable. If, at step 224 the compiler 150 determines that the "Constant_Val" variable is less than or equal to the "Preserved_Val" variable, then the method 200 proceeds to step 226, where the compiler 150 returns a constant offset value of zero. Otherwise, the method 200 proceeds to step 228, where the compiler 150 extracts a constant offset value that is equal to the value of: the Preserved_Val variable minus the Constant_Val variable.

Accordingly, if, through method steps 200, the compiler 150 is able to extract a constant offset value, then the constant offset value can be included in assembly-level instructions that implement the "register plus offset" approach.

In sum, embodiments of the invention set forth a technique for extracting a memory address offset from a 64-bit type-conversion expression included in high-level source code of a computer program. The compiler 150 receives the 64-bit type-conversion expression, which includes one or more 32-bit expressions, e.g., "−20*x", "30*y" and "1100". The compiler 150 determines a range for each of the one or more 32-bit expressions according to step 204 of the method 200 described above and then determines whether the range of each of the one or more 32-bit expressions is a subset of the range of a 32-bit unsigned integer. Assuming that the ranges meet this subset requirement, the compiler 150 calculates a memory address offset based on the ranges of each of the one or more 32-bit expressions, as described above in steps 212-228 of the method 200.

One advantage of the techniques disclosed herein is that the compiler 150 is configured to automatically translate high-level instructions of a computer program into assembly-level instructions that implement the "register plus offset" approach, which, as described herein, provides several benefits. Again, these benefits may include effecting an overall reduction in the number of registers referenced by the computer program, as well as an overall reduction in the complexity of the address computations included therein. As a result, the computer program may execute more efficiently on processors and may allow for other computer programs to utilize the freed-up registers, which increases the potential for parallel execution.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

The invention claimed is:

1. A method for extracting a memory address offset from a 64-bit type-conversion expression included in high-level source code of a computer program, the method comprising:
receiving the 64-bit type-conversion expression, wherein the 64-bit type-conversion expression includes one or more 32-bit expressions;
for each of the one or more 32-bit expressions, determining a range for the 32-bit expression;
calculating a total range by summing the ranges of the 32-bit expressions;
determining that the total range is a subset of a range for a 32-bit unsigned integer;
calculating the memory address offset based on the ranges for the one or more 32-bit expressions; and
generating at least one assembly-level instruction that references the memory address offset.

2. The method of claim 1, wherein a first 32-bit expression included in the one or more 32-bit expressions comprises a constant value.

3. The method of claim 2, wherein determining the range for the first 32-bit expression comprises extracting the constant value associated with the first 32-bit expression.

4. The method of claim 2, wherein a second 32-bit expression included in the one or more 32-bit expressions includes at least one variable.

5. The method of claim 4, wherein determining the range for the second 32-bit expression comprises:
parsing the high-level source code to determine a minimum value that would be assigned to the at least one variable during execution of the computer program; and
setting a lower bound of the range for the second 32-bit expression to the minimum value.

6. The method of claim 5, wherein calculating the memory address offset based on the ranges for the one or more 32-bit expressions comprises:
establishing a first variable and a second variable as having values equal to zero;
adding the constant value associated with the first 32-bit expression to the first variable;
subtracting the lower bound associated with the second 32-bit expression from the second value; and
setting the memory address offset to the different between the second value and the first value when the first value is less than or equal to the second value; or
setting the memory address offset to zero when the first value is greater than the second value.

7. The method of claim 1, wherein the memory address offset is Referenced inline in the at least one assembly-level instruction.

8. The method of claim 1, wherein the assembly-level instruction, when executed by a processor, causes the processor to:
load a first value from a base register;
add the first value to the memory address offset to produce a second value; and
reference a memory address that is indexed by the second value.

9. A non-transitory computer-readable storage medium storing instructions that, when executed by a processor, cause the processor to extract a memory address offset from a 64-bit type-conversion expression included in high-level source code of a computer program, by performing the steps of:
receiving the 64-bit type-conversion expression, wherein the 64-bit type-conversion expression includes one or more 32-bit expressions;
for each of the one or more 32-bit expressions, determining a range for the 32-bit expression;
calculating a total range by summing the ranges of the 32-bit expressions;
determining that the total range is a subset of a range for a 32-bit unsigned integer;
calculating the memory address offset based on the ranges for the one or more 32-bit expressions; and
generating at least one assembly-level instruction that references the memory address offset.

10. The non-transitory computer-readable storage medium of claim 9, wherein a first 32-bit expression included in the one or more 32-bit expressions comprises a constant value.

11. The non-transitory computer-readable storage medium of claim 10, wherein determining the range for the first 32-bit expression comprises extracting the constant value associated with the first 32-bit expression.

12. The non-transitory computer-readable storage medium of claim 10, wherein a second 32-bit expression included in the one or more 32-bit expressions includes at least one variable.

13. The non-transitory computer-readable storage medium of claim 12, wherein determining the range for the second 32-bit expression comprises:

parsing the high-level source code to determine a minimum value that would be assigned to the at least one variable during execution of the computer program; and setting a lower bound of the range for the second 32-bit expression to the minimum value.

14. The non-transitory computer-readable storage medium of claim 13, wherein calculating the memory address offset based on the ranges for the one or more 32-bit expressions comprises:

establishing a first variable and a second variable as having values equal to zero;

adding the constant value associated with the first 32-bit expression to the first variable;

subtracting the lower bound associated with the second 32-bit expression from the second value; and setting the memory address offset to the different between the second value and the first value when the first value is less than or equal to the second value; or setting the memory address offset to zero when the first value is greater than the second value.

15. The non-transitory computer-readable storage medium of claim 9, wherein the memory address offset is referenced inline in the at least one assembly-level instruction.

16. The non-transitory computer-readable storage medium of claim 9, wherein the assembly-level instruction, when executed by the processor, causes the processor to:

load a first value from a base register;

add the first value to the memory address offset to produce a second value; and reference a memory address that is indexed by the second value.

17. A system for extracting a memory address offset from a 64-bit type-conversion expression included in high-level source code of a computer program, the system comprising:

a processor, configured to:

receive the 64-bit type-conversion expression, wherein the 64-bit type-conversion expression includes one or more 32-bit expressions;

for each of the one or more 32-bit expressions, determine a range for the 32-bit expression;

calculate a total range by summing the ranges of the 32-bit expressions;

determine that the total range is a subset of a range for a 32-bit unsigned integer;

calculate the memory address offset based on the ranges for the one or more 32-bit expressions; and generate at least one assembly-level instruction that references the memory address offset.

18. The system of claim 17, wherein a first 32-bit expression included in the one or more 32-bit expressions comprises a constant value.

19. The system of claim 18, wherein determining the range for the first 32-bit expression comprises extracting the constant value associated with the first 32-bit expression.

20. The system of claim 18, wherein a second 32-bit expression included in the one or more 32-bit expressions includes at least one variable.

* * * * *

UNITED STATES PATENT AND TRADEMARK OFFICE
CERTIFICATE OF CORRECTION

PATENT NO. : 9,009,686 B2  
APPLICATION NO. : 13/659786  
DATED : April 14, 2015  
INVENTOR(S) : Xiangyun Kong et al.

Page 1 of 1

It is certified that error appears in the above-identified patent and that said Letters Patent is hereby corrected as shown below:

Claims:

Column 8, Claim 7, Line 26, please delete "Referenced" and insert --referenced--.

Signed and Sealed this  
First Day of December, 2015

Michelle K. Lee  
*Director of the United States Patent and Trademark Office*